United States Patent
Genyk et al.

[15] 3,702,510
[45] Nov. 14, 1972

[54] LICENSE PLATE SUPPORT AND PIVOTABLE COVER MEMBER

[72] Inventors: Walter Genyk, Birmingham; Raymond E. Martin, Southfield; George B. Swift, Dearborn Heights; Robert L. Wiggins, Livonia; Raymond W. Wolfe, Dearborn, all of Mich.

[73] Assignee: Ford Motor Company, Dearborn, Mich.

[22] Filed: Sept. 17, 1970

[21] Appl. No.: 72,938

[52] U.S. Cl. ................................................40/209
[51] Int. Cl. ..............................................G09f 7/00
[58] Field of Search.........40/10, 13, 129 C, 200, 209; 296/1 C; 280/152 A

[56] References Cited

UNITED STATES PATENTS

| | | | |
|---|---|---|---|
| 2,760,811 | 8/1956 | Basferd | 296/1 C |
| 3,131,000 | 4/1964 | Pierce | 296/1 C |
| 3,340,639 | 9/1967 | Savage | 40/209 |
| 3,385,450 | 5/1968 | Nadler et al. | 211/42 |

*Primary Examiner*—Robert W. Michell
*Assistant Examiner*—Wenceslao J. Contreas
*Attorney*—John R. Faulkner and William E. Johnson

[57] ABSTRACT

A license plate support and pivotable cover member has as the principle element thereof a generally U-shaped license plate support member formed in a plastic molding operation. One leg of the member is connected to the cross arm of the member by a living hinge, the hinge being formed in the plastic molding operation. One leg of the member provides structure for attaching the member to a motor vehicle while the other leg of the member provides a license plate support structure. A spring is mounted between the attachment leg and the support leg of the member for biasing these two legs to their generally U-shaped configuration. When the attachment leg of the member is secured to a vehicle, the license plate support leg may be pivoted away therefrom by force but will return to a normal position when freed of the force.

10 Claims, 5 Drawing Figures

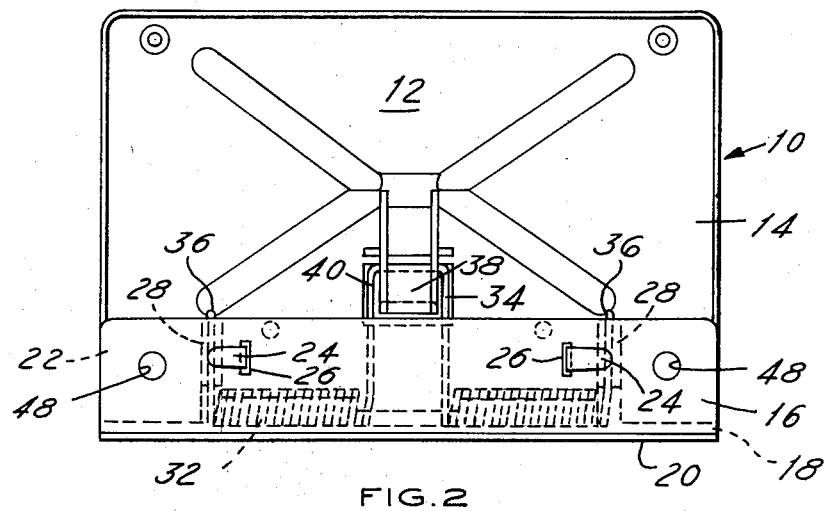
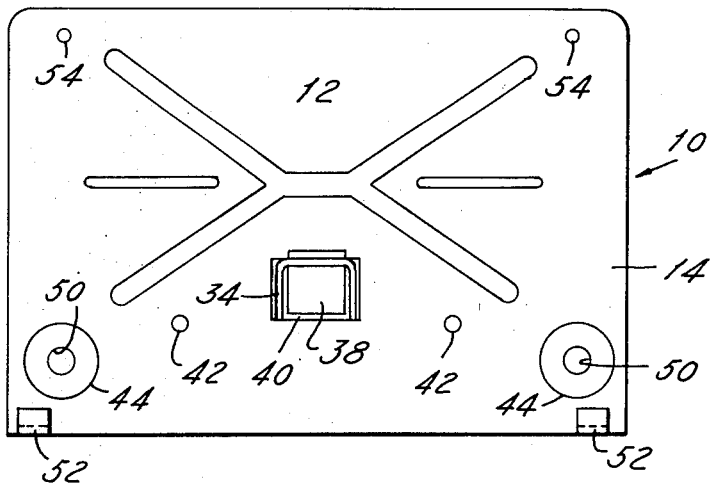
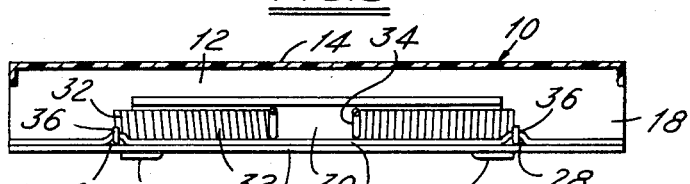
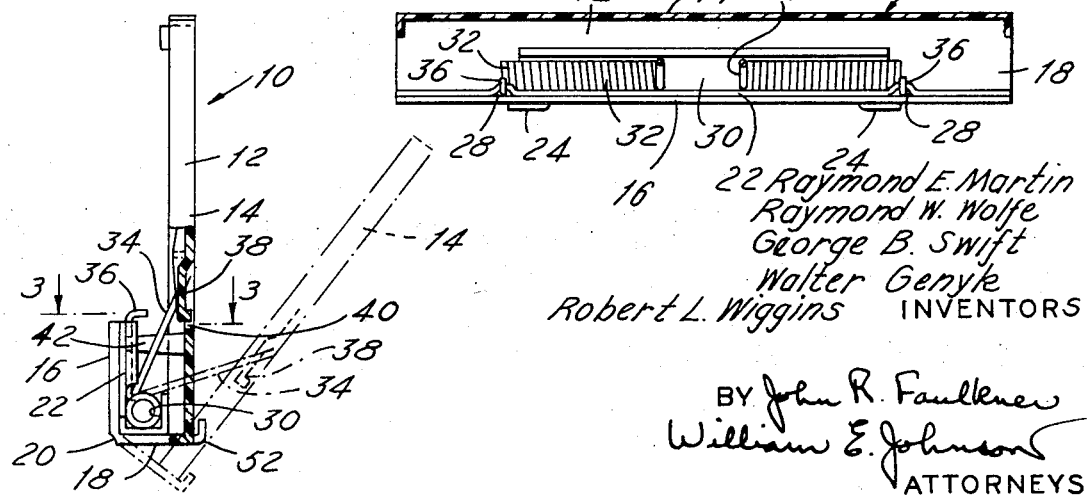
Raymond E. Martin
Raymond W. Wolfe
George B. Swift
Walter Genyk
Robert L. Wiggins    INVENTORS
BY John R. Faulkner
William E. Johnson
ATTORNEYS Raymond E. Martin
Raymond W. Wolfe
George B. Swift
Walter Genyk
Robert L. Wiggins
INVENTORS

LICENSE PLATE SUPPORT AND PIVOTABLE COVER MEMBER

BACKGROUND OF THE INVENTION

Many motor vehicles employ a center fill opening at the rear of the vehicle to the fuel tank. With such a fill opening, the operator of the vehicle may pull either to the right or to the left hand side of a fuel pump in order to receive fuel for the vehicle. It has been a common expedient in the art to cover the center fill opening to the fuel tank of the vehicle with a pivotable cover member which supports the license plate of the vehicle thereon.

The license plate support structures used for center fill openings are generally complex in design. In general, the prior art structures utilize several pieces of metal which are interconnected to construct the license plate support and pivotable cover member. Since a number of pieces are included in the prior art structures, these structures are rather expensive.

The license plate support and pivotable cover member of this invention has been designed so that a substantial portion of the structure is formed in a single plastic molding operation. The member is substantially cheaper to make than prior art structures because of the reduced number of parts contained therein. The cost involved in the assembly of the structure is also reduced because the number of parts which must be assembled is curtailed.

The license plate support and pivotable cover member of this invention is also one which is of particular value to the designer of vehicles as the color of the member may be changed by changing the color of plastic employed in forming the same. If desired, the license plate support member may be molded of a plastic having a color which matches the exterior color of the vehicle.

SUMMARY OF THE INVENTION

This invention relates to a license plate support member and, more particularly, to a license plate support and pivotable cover member to be employed as a removable cover for a center fill fuel line to a fuel tank of a vehicle.

In accordance with the teachings of this invention, a license plate support and pivotable cover member includes the following structure. The main element of the structure is a generally U-shaped license plate support member formed as a unitary member in a plastic molding operation. One leg of the U-shaped member is connected to the cross arm of the member by a plastic living hinge which is formed in the molding operation. One leg of the member provides structure for attaching the member to a vehicle while the other leg of the member provides a license plate support structure. A spring is mounted between the attachment leg and the support leg of the U-shaped member for biasing the legs to their normal, U-shaped configuration. When the attachment leg of the member is secured to the vehicle, the license plate support leg may be pivoted away from the vehicle but will return to its normal position with respect to the attachment leg when released.

In accordance with further teachings of the structure of this invention, the generally U-shaped member has a short leg and a long leg. The short leg is connected to the cross arm of the member by the living hinge. The structure for attaching the member to the vehicle is formed on the short leg of the member while the license plate supporting structure is formed on the long leg of the member. A metal plate is secured to the short leg of the member in order to strengthen the same.

The spring utilized between the long and the short leg of the U-shaped member, in accordance with still further teachings of the invention, is a coil spring. This spring has a central extending finger cooperable with the long leg of the member and a pair of extending fingers at opposite ends thereof which cooperate with the short leg of the member. As previously described, the spring biases the legs of the member to their normal position.

Thus, the substantial portion of the structure of this invention is a plastic member which is formed in a single molding operation. The only other elements that are added to the plastic member to form the structure are a spring and a metal plate. The addition of these two elements to the U-shaped plastic member is easy to accomplish. Because of its simple design, the structure of this invention has a low cost. Also, since the major portion of the member is made form plastic, the color of the plastic may be selected to match the exterior color of the vehicle.

BRIEF DESCRIPTION OF THE DRAWINGS

FIG. 1 is a rear elevation view of a license plate support and pivotable cover member formed in accordance with the teachings of a preferred embodiment of this invention.

FIG. 2 is a front elevation view of the member of FIG. 1.

FIG. 3 is a plan view of the member of FIG. 1 taken along the line 3—3 of FIG. 4.

FIG. 4 is a side elevation view, partly in cross section, of the member of FIG. 1 showing the member in a normal position and in ghost in a pivoted position.

DESCRIPTION OF THE PREFERRED EMBODIMENT CONSTRUCTION

Figure 5:
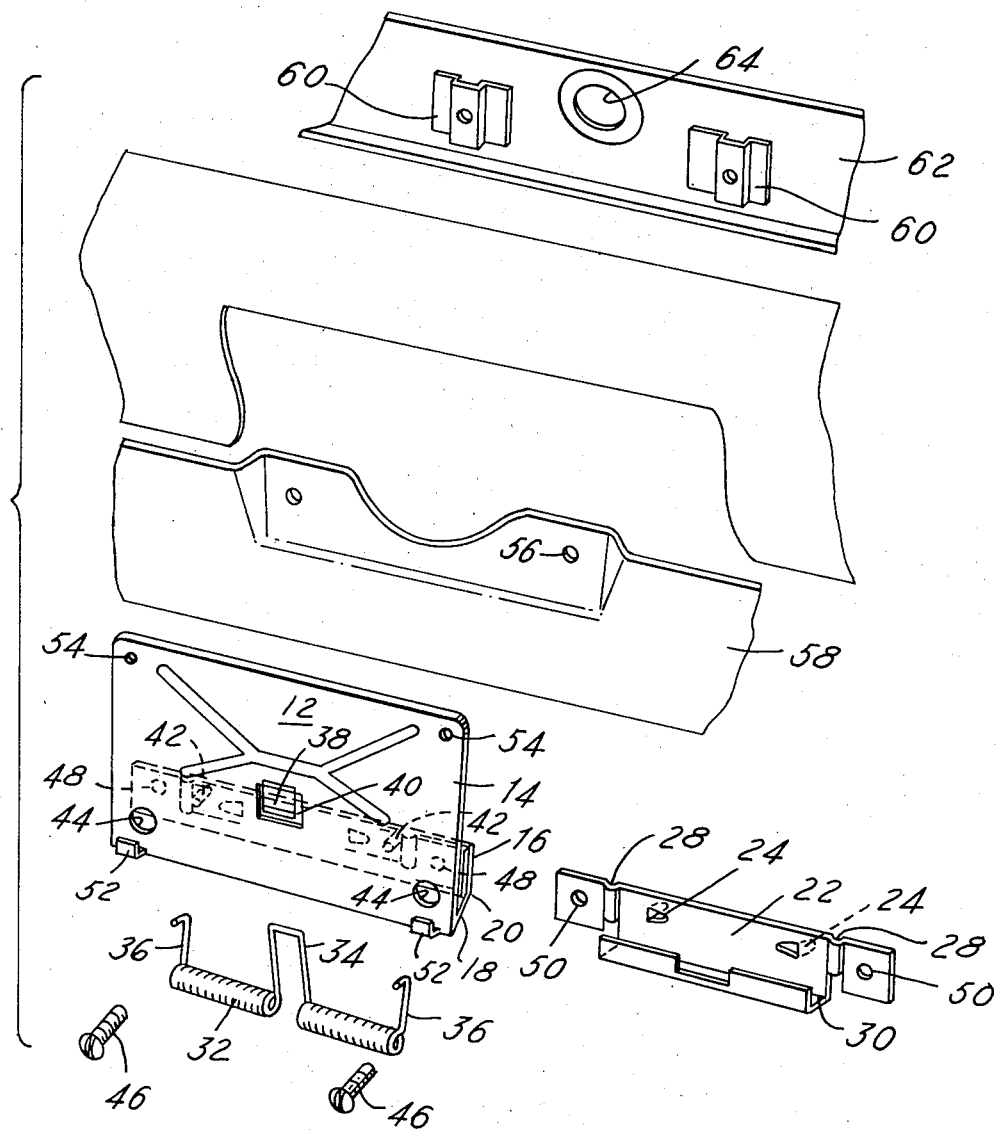
FIG. 5 is a perspective view showing both the member of this invention in a disassembled condition and how the member is associated with vehicle structure in order to provide the cover for the opening to the fuel tank of the vehicle.

The license plate and pivotable cover member formed in accordance with a preferred embodiment of the teachings of this invention is shown in the Figures of the drawing and generally identified by the numeral 10. The member includes a generally U-shaped shaped license plate support member 12 formed of a suitable plastic such as polypropylene in a plastic molding operation. The member 12 has a long leg 14, a short leg 16, and a cross arm 18. The short leg and the cross arm are pivotably joined by a plastic living hinge 20 [best seen in FIG. 4] which is formed during the molding operation which forms the support member 12 by reducing the thickness of plastic interconnecting the short leg and the cross arm to form a thin web therebetween. The manner in which the formation of a living hinge is accomplished is known to those familiar with plastic molding technology. With such a living hinge construction, the long leg and the cross arm may be pivoted about the living hinge as a unit relative to the short leg.

A metal plate 22 [best seen in FIG. 5] is formed so as to have a pair of tabs 24 thereon. The metal plate is secure to the short leg 16 of the license plate support member 12 by extending the pair of tabs through a pair of openings 26 [FIG. 1] in the short leg and thereafter folding the tabs over onto the outward facing surface of the short leg. The openings in the short leg are formed simultaneously with the molding of the member 12. The metal plate also has a pair of grooves 28 formed therein [best seen in FIG. 5] and a channel 30 formed along the bottom portion thereof.

A coil spring 32 acts between the short leg 16 and the long leg 14 of the license plate support member 12. This spring biases the legs to their normally U-shaped configuration. In greater detail, the coil spring has a central extending finger 34 and a pair of extending fingers 36 at opposite ends of the coil spring [FIG. 5]. Each one of the fingers 36 is received in one of the grooves 28 of the metal plate 22. Since the metal plate is anchored to the short leg of the member 12 by the tabs 24, the spring is mounted securely to the short leg of the member. The central finger 34 of the coil spring 32 is received on a retaining tab 38 which extends into a central opening 40 of the long leg 14 of the member 12. Both the tab and the opening are formed simultaneously with the long leg of the member in the plastic molding operation. The retaining tab and central opening are best seen in FIGS. 2 and 4.

As may best be appreciated by viewing FIG. 4, when the long leg 14 of the member 12 is pivoted relative to the short leg 16, as protrayed in ghost in FIG. 4, the central finger 34 acts on the retaining tab 38. This action of the finger on the tab places sufficient spring force on the long leg that when it is released, it returns to its normal position as illustrated in solid line in FIG. 4. When the various fingers of the coil spring 32 are acting on their respective legs of the member, the coil spring itself is positioned and contained within the channel 30 of the metal plate 22.

With reference to FIGS. 4 and 5, the long leg 14 of the member 12 has a pair of inwardly extending projections 42 formed thereon in the plastic molding operation. These projections engage portions of the metal plate 22 in order to locate the two legs 14 and 16 with respect to one another when the coil spring 32 biases the legs into their normal U-shaped position with respect to one another.

As best seen in FIGS. 2 and 5, the long leg 14 of the license plate support member 12 has a pair of enlarged openings 44 therein located on opposite sides along the lower portion thereof. These openings are sufficiently large to permit the shank and the head of a threaded fastener 46 [shown only in FIG. 5] to pass therethrough. The short leg 16 and the metal plate 22, respectively, have a pair of openings 48 and 50 therethrough which are sufficiently large to permit passage therethrough of only the shank of the fastener 46.

Also, as may best be seen in FIGS. 2 and 5, the long leg 14 of the license plate support member 12 has a pair of upturned lips 52 formed on the outward facing, lower portion of the leg during the plastic molding operation. The long leg also has a pair of fastener receiving apertures 54 formed in the upper portion thereof. The fastener receiving apertures are formed simultaneously with the formation of the member 12.

ASSEMBLY

The assembly of the license plate support and pivotable cover member 10 of this invention will be described in detail in conjunction with FIG. 5. In order to assemble the member 10, the coil spring 32 is seated in the channel 30 of the metal plate 22 with the fingers 36 at opposite ends of the spring received in the grooves 28 of the metal plate. The metal plate is, in turn, positioned in association with the short leg 16 of the license plate support member 12. The pair of tabs 24 of the metal plate are positioned so that they extend through the openings 26 in the short leg of the member. The tabs are then folded over to firmly affix the plate to the short leg of the member with the fingers 36 of the coil spring held firmly in place.

After the above described assembly operation, the central finger 34 of the coil spring 32 is moved forward into the opening 40 formed in the long leg 14 of the license plate support member 12. The central finger is then allowed to move up over the retaining tab 38 formed in the long leg so that a spring force is applied between the long leg and the short leg. This spring force biases the legs into their normally U-shaped configuration in which the projections 42 on the long leg come into contact with the metal plate secured to the short leg.

The above described operation forms the license plate support and pivotable cover member 10, which member is attachable to a vehicle as described below. It should be noted that the assembly of the member 10 is easy to accomplish and only three parts are involved in the preferred construction.

In order to attach the member 10 to a vehicle, the pair of fasteners 46 are employed. The fasteners extend through the openings 44 in the long leg 14 of the member 12 and the heads thereof come into contact in the area about the openings 48 and 50 respectively formed in the short leg 16 and the metal plate 22. The shanks of the fastener extend through suitable openings 56 [FIG. 5] in a body structure member 58 and finally into receiving devices 60 secured to stationary body structure 62. A fuel opening 64 is provided in the stationary body structure 62 in order to receive fuel for a fuel tank (not shown). Once the license plate support and pivotable cover member has been attached, the long leg of the member may be pivoted forwardly as viewed in FIG. 5 in order to expose the fuel opening 64 to a service station attendant.

A license plate is mounted on the member 10 by placing the bottom edge of the license plate in the upturned lips 52 formed on the long leg 14 of the license plate support member 12. A pair of screws are passes through suitable openings in the upper portion of the license plate and into the fastener receiving apertures 54 formed in the upper portion of the long leg.

The invention disclosed will have many modifications which will be apparent to those skilled in the art in view of the teachings of this specification. It is intended that all modifications which fall within the true spirit and scope of this invention be included within the scope of the appended claims.

We claim:

1. A license plate support and pivotable cover member which comprises:

a generally U-shaped license plate support member formed as a unitary member in a plastic molding operation, one leg of said U-shaped member being connected to the cross arm of the member by a plastic living flexible plastic hinge formed in the plastic molding operation, one leg of said member providing an attachment structure and said other leg of said member providing a license plate support structure, and spring means mounted between said attachment leg and said support leg for biasing said legs to their generally U-shaped configuration, whereby when said attachment leg is secured to a vehicle, said license plate support leg may be pivoted away therefrom by force but will return to a normal position when released.

2. A license plate support and pivotable cover member which comprises:

a generally U-shaped license plate support member formed as a unitary member in a plastic molding operation, said member having a short leg and a long leg, said short leg of said member being connected to the cross arm of the member by a living flexible plastic hinge formed in the plastic molding operation, attachment means formed on said short leg of said U-shaped member for attaching said member to a motor vehicle.

supporting means formed on said long leg of said U-shaped member for supporting a license plate thereon, plate means secured to the inward facing portion of said short leg of said U-shaped member for strengthening said short leg, and spring means supported between the inward facing portions of said legs for biasing said legs to their generally U-shaped configuration, whereby when said short leg of said member is attached to a vehicle said long leg of sad member may be pivoted away therefrom but will return to the normal position with respect thereto when released.

3. The license plate support and pivotable cover member as defined in claim 2 wherein:

said plate means is a metal plate, and wherein:

said plate is attached securely to said short leg of said U-shaped member by a pair of tabs formed integrally with said plate, sad short leg having a pair of openings therein through which said tabs are inserted and folded over to engage the outward facing surface of the said leg.

4. The license plate support and pivotable cover member as defined in claim 3 wherein:

said spring means is a coil spring, said spring having both a central extending finger cooperable with said long leg of said U-shaped member and a pair of extending fingers at opposite ends thereof cooperable with said short leg of said U-shaped member.

5. The license plate support and pivotable cover member as defined in claim 4 wherein;

said metal plate has a pair of grooves formed therein, each of said grooves for receiving and holding one of said pair of extending fingers formed at the opposite ends of said coil spring when said plate is attached to said short leg of said U-shaped member.

6. The license plate support and pivotable member as defined in claim 5 wherein:

said long leg of said U-shaped member has a central opening formed therein, wherein:

a retaining tab formed integrally with said long leg in said plastic molding operation extends into said central opening, and wherein:

said central extending finger of said coil spring is received upon and acts upon said retaining tab for the purpose of biasing said two legs of said U-shaped member to their normal positions.

7. The license plate support and pivotable member as defined in claim 6 wherein:

said metal plate has a channel formed along the bottom portion thereof which is adjacent the cross arm of said U-shaped member when said plate is secured to said short leg, said channel for receiving and supporting the coil portion of said coil spring when said extending fingers of said coil spring are associated with said legs of said member.

8. The license plate support and pivotable member as defined in claim 7 wherein:

said long leg of said U-shaped member has a pair of inwardly extending projections formed therein during the plastic molding operation which forms said member, said projections engaging portions of said metal plate to locate said legs properly with respect to one another when said coil spring biases said legs into a normal position with respect to one another.

9. The license plate support and pivotable member as defined in claim 8 wherein:

said long leg, said short leg and said metal plate all have a pair of aligned openings therein, said opening of said long leg being sufficiently large to permit the passage of an entire fastener therethrough and said openings of said other two elements forming said attachment means and being large enough only to permit the passage of the shank of the fastener therethrough.

10. The license plate support and pivotable member as defined in claim 9 wherein:

said supporting means comprises a pair of up turned lips formed on the outward facing, lower portion of said long leg in which the base of a license plate may rest and a pair of fastener receiving apertures formed through the upper portion of said long leg for receiving fasteners to secure the license thereto, said lips and apertures being formed integrally with said U-shaped member in said plastic molding operation.

* * * * *